United States Patent
Di Martino et al.

(10) Patent No.: US 10,697,345 B2
(45) Date of Patent: Jun. 30, 2020

(54) METHOD TO DETERMINE THE QUANTITY OF METAL POWDERS ACCUMULATED IN A PARTICULATE FILTER FOR AN INTERNAL COMBUSTION ENGINE

(71) Applicant: MAGNETI MARELLI S.p.A., Corbetta (IT)

(72) Inventors: Umberto Di Martino, Castelfranco Emilia (IT); Lorenzo Francia, Pianoro (IT); Daniele Benassi, Bologna (IT)

(73) Assignee: MAGNETI MARELLI S.p.A., Corbetta (IT)

( * ) Notice: Subject to any disclaimer, the term of this patent is extended or adjusted under 35 U.S.C. 154(b) by 0 days.

(21) Appl. No.: 16/263,567

(22) Filed: Jan. 31, 2019

(65) Prior Publication Data
US 2019/0234285 A1 Aug. 1, 2019

(30) Foreign Application Priority Data
Feb. 1, 2018 (IT) .................. 102018000002311

(51) Int. Cl.
*F01N 9/00* (2006.01)
*F01N 13/00* (2010.01)
(Continued)

(52) U.S. Cl.
CPC ....... *F01N 13/0093* (2014.06); *F01N 3/0232* (2013.01); *F01N 9/005* (2013.01);
(Continued)

(58) Field of Classification Search
CPC .... F01N 3/0232; F01N 11/002; F01N 11/005; F01N 2560/08; F01N 2900/1406; F01N 2900/1611
See application file for complete search history.

(56) References Cited

U.S. PATENT DOCUMENTS

| | | | |
|---|---|---|---|
| 7,506,503 B2* | 3/2009 | Liimatta | F01N 3/0253 60/297 |
| 2012/0047876 A1* | 3/2012 | Youn | F01N 9/002 60/274 |
| 2016/0123207 A1* | 5/2016 | Aso | F01N 9/002 96/408 |

FOREIGN PATENT DOCUMENTS

| | | |
|---|---|---|
| DE | 102009002603 A1 | 11/2009 |
| DE | 102010038189 A1 | 4/2012 |

(Continued)

OTHER PUBLICATIONS

Search Report for Italian Application No. 201800002311 dated Oct. 18, 2018.

*Primary Examiner* — Jonathan R Matthias
(74) *Attorney, Agent, or Firm* — Howard & Howard Attorneys PLLC

(57) ABSTRACT

A method to determine the actual quantity of metal powders or ashes trapped in a particulate filter, which involves determining an estimated value of the quantity of metal powders trapped in the particulate filter based on an estimation model; determining a measured value of the quantity of metal powders trapped in the particulate filter; updating the estimated value of the quantity of metal powders trapped in the particulate filter as a function of the measured value; and determining the actual quantity of metal powders or ashes trapped in a particulate filter as a function of the update of the estimated value of the quantity of metal powders trapped in the particulate filter.

11 Claims, 2 Drawing Sheets

(51) Int. Cl.
*G01N 15/10* (2006.01)
*F01N 3/023* (2006.01)
*F02D 41/14* (2006.01)

(52) U.S. Cl.
CPC ......... *F02D 41/1445* (2013.01); *G01N 15/10* (2013.01); *F01N 2560/08* (2013.01); *F01N 2900/1606* (2013.01); *F01N 2900/1611* (2013.01); *F02D 2041/1433* (2013.01); *F02D 2200/0812* (2013.01)

(56) References Cited

FOREIGN PATENT DOCUMENTS

| EP | 1467071 A1 | | 10/2004 |
|----|------------|---|---------|
| JP | 2008121557 A | * | 5/2008 |
| WO | 2017047349 A1 | | 3/2017 |

\* cited by examiner

METHOD TO DETERMINE THE QUANTITY OF METAL POWDERS ACCUMULATED IN A PARTICULATE FILTER FOR AN INTERNAL COMBUSTION ENGINE

CROSS-REFERENCE TO RELATED APPLICATIONS

This patent application claims priority from Italian patent application no. 102018000002311 filed on Feb. 1, 2018, the entire disclosure of which is incorporated herein by reference.

TECHNICAL FIELD

The invention relates to a method to determine the quantity of metal powders accumulated in a particulate filter for an internal combustion engine, preferably a gasoline engine.

PRIOR ART

As it is known, an internal combustion engine, preferably—though not exclusively—a gasoline engine, is provided with an exhaust gas system comprising, in turn, an exhaust gas after—treatment system with a particulate filter (also known as Gasoline Particulate Filter) arranged along an exhaust duct and with a catalytic converter, which is also arranged along the exhaust duct, upstream of the particulate filter. According to a preferred embodiment, the catalytic converter and the particulate filter are arranged one after the other on the inside of a common tubular container.

The exhaust system is further provided with an electronic control system comprising a differential pressure sensor having a first and a second input connected to the inlet and to the outlet, respectively, of the particulate filter, as well as an output providing an electrical signal indicating the pressure drop at the ends of said particulate filter; a temperature sensor arranged at the outlet of the particulate filter and providing an electrical signal indicating the temperature of the exhaust gases flowing out of the particulate filter; a temperature sensor arranged at the inlet of the particulate filter and providing an electrical signal indicating the temperature of the exhaust gases flowing into the particulate filter; and an electronic control unit connected to said sensors and configured to determine the quantity of particulate accumulated in the particulate filter and to activate the regeneration thereof when given conditions occur, for example when the accumulated quantity of particulate exceeds a predetermined threshold.

The particulate filter, indeed, acts like a mechanical barrier for the passage of the particulate and usually consists of channels parallel to porous walls and alternatively obstructed. The obstructions force the exhaust gases to flow through the side walls of the channels, so that the unburned particles making up the particulate, at first, are held back in the porosities of the side walls and, then, when they are completely filled, accumulate on the inner surfaces of the walls of the channels, thus forming a porous layer. As the particulate keeps accumulating on the inner surfaces of the walls of the channels, the pressure drop on the particulate filter increases, as does the counter-pressure generated by the particulate filter.

The particulate cannot be accumulated indefinitely, as too large accumulations cause:

deterioration of the performances, of the drivability and of the consumptions of the engine, in the worst case scenario up to the stall of the engine; and the destruction of the particulate filter, in case of self-firing and uncontrolled combustion of the particulate; as a matter of fact, in the presence of large accumulations of particulate and under particular driving conditions, "critical" regeneration phenomena can occur, consisting in a sudden and uncontrolled combustion of the particulate, which, in turn, is responsible for the high temperatures generated inside the particulate filter and for the consequent damaging of the particulate filter itself.

Therefore, the trapped particulate periodically needs to be removed by carrying out a so-called "regeneration" of the particulate filter, i.e. by removing the accumulated particulate.

Regeneration can basically be divided into active regenerations, i.e. regenerations controlled by the electronic control unit, and spontaneous regenerations, i.e. regenerations generated in an uncontrolled and unforeseeable manner during a phase of accumulation.

Hence, during the operation of an internal combustion engine, a distinction can be made between accumulation phases, i.e. intervals of time in which there is a progressive accumulation of particulate in the particulate filter and there are no active regenerations, but only—at most—spontaneous regenerations, and regeneration phases, i.e. intervals of time in which the active regeneration takes place and the quantity of particulate accumulated in the particulate filter decreases.

Experiments have shown that the trapping efficiency can vary as a function of a plurality of control parameters, among which there are the quantity of particulate trapped in the particulate filter, the quantity of metal powders accumulated in the particulate filter and the volume flow rate of the exhaust gases flowing through the particulate filter. The metal powders accumulated in the particulate filter help increase the trapping efficiency of the particulate filter because they obstruct the channels with porous walls making up the particulate filter, but, unlike the particulate, cannot be regenerated.

Therefore, the quantity of metal powders accumulated in the particulate filter is an extremely important control parameter in order to obtain a correct alternation between the accumulation phases and the particulate filter regeneration phases.

The control unit is usually designed so as to determine the quantity of metal powders accumulated in the particulate filter through an estimation model, which is stored in the control unit itself and uses the number of kilometres covered by the vehicle.

However, it is evident that an estimation model of the type described above and based on the number of kilometres covered by the vehicle is not sufficiently reliable and, indeed, could cause an underestimation or an overestimation of the quantity of metal powders accumulated in the particulate filter, with potentially highly negative effects for the particulate filter.

DESCRIPTION OF THE INVENTION

The object of the invention is to provide a method to determine the quantity of metal powders accumulated in a particulate filter for an internal combustion engine, which is not affected by the drawbacks of the prior art and, at the same time, is easy and economic to be implemented.

According to the invention, there is provided a method to determine the quantity of metal powders accumulated in a particulate filter for an internal combustion engine according to the appended claims.

BRIEF DESCRIPTION OF THE DRAWINGS

The invention will now be described with reference to the accompanying drawings, showing a non-limiting embodiment thereof, wherein.

PREFERRED EMBODIMENTS OF THE INVENTION

Figure 1:
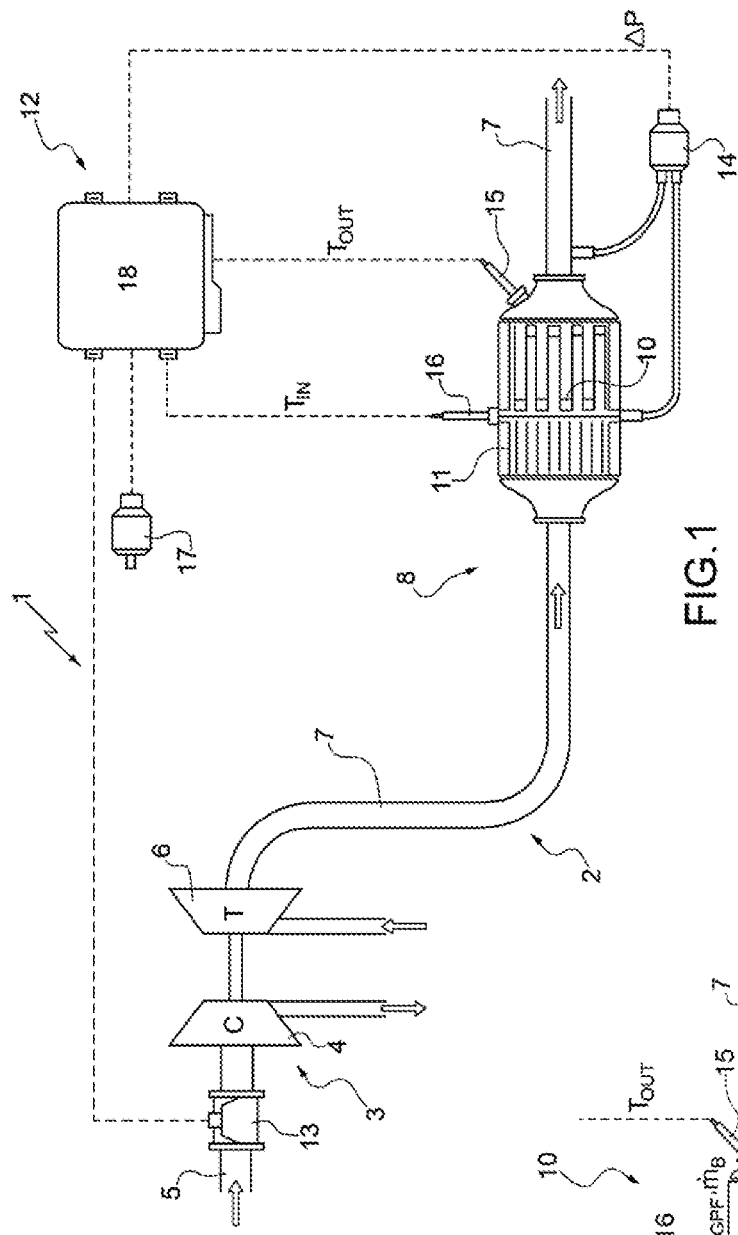
FIG. 1 schematically shows an exhaust gas system for an internal combustion engine provided with an exhaust gas after-treatment system.

In FIG. 1, number 1 indicates, as a whole, an internal combustion engine provided with an exhaust gas system 2 in a motor vehicle (not shown). In particular, the description below can find advantageous application both in case of an internal combustion engine 1 with a direct injection and in case of an internal combustion engine 1 with an indirect injection.

Furthermore, according to a preferred embodiment, the description below finds advantageous—though non-exclusive—application in case of an internal combustion engine 1 in which the fuel used is gasoline.

In particular, by way of non-limiting example, the internal combustion engine 1 is a supercharged engine and comprises a turbocharger 3 consisting of a compressor 4, which is arranged along an air intake duct 5, and of a turbine 6, which is coupled to the compressor 4 and is arranged along an exhaust duct 7 originating from an exhaust manifold.

The internal combustion engine 1 comprises a number of injectors (not shown), which inject fuel into respective cylinders (not shown) arranged in line, each housing a respective piston (not shown), which is mechanically connected to a drive shaft so as to transmit the force generated by the combustion inside the cylinders to the drive shaft itself.

The exhaust gas system 2 is provided with an exhaust gas after-treatment system 8 comprising a particulate filter 10 (also known as Gasoline Particulate Filter) arranged along the exhaust duct 7, downstream of the turbocharger 3. According to a preferred variant, the exhaust gas after-treatment system 8 is provided with a catalytic converter 11 arranged along the exhaust duct 7, upstream of the particulate filter 10.

According to a preferred embodiment, the catalytic converter 11 and the particulate filter 10 are arranged one after the other on the inside of a common tubular container.

The exhaust system 2 is further provided with an electronic control system 12 comprising an air flow rate measurer 13 (air flow meter) arranged along the air intake duct 5 and designed to generate an electrical signal indicating the air flow rate flowing in the intake duct 5; a differential pressure sensor 14 having a first and a second input connected to the inlet and to the outlet, respectively, of the particulate filter 10, as well as an output providing an electrical signal indicating the pressure drop ΔP at the ends of the particulate filter 10; a temperature sensor 15 arranged at the outlet of the particulate filter 10 and providing an electrical signal indicating the temperature $T_{OUT}$ of the exhaust gases flowing out of the particulate filter 10; a temperature sensor 16 arranged at the inlet of the particulate filter 10 and providing an electrical signal indicating the temperature $T_{IN}$ of the exhaust gases flowing into the particulate filter 10; an atmospheric pressure sensor 17; and an electronic control unit 18 connected to said sensors 13, 14, 15, 16, 17 and configured to determine the quantity of particulate accumulated in the particulate filter 10 and configured to activate the regeneration thereof when given conditions occur, for example when the accumulated quantity of particulate exceeds a predetermined threshold.

Figure 2:
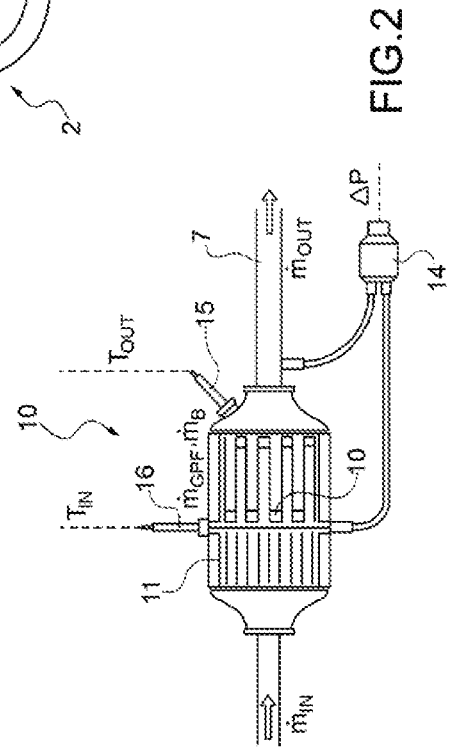
FIG. 2 shows, more in detail, a particulate filter of FIG. 1.

The particulate filter 10, indeed, acts like a mechanical barrier for the passage of the particulate and preferably consists of channels parallel to porous walls and alternatively obstructed, according to what is schematically shown in FIG. 2. The obstructions force the exhaust gases to flow through the side walls of the channels, so that the unburned particles making up the particulate, at first, are held back in the porosities of the side walls and, then, when they are completely filled, accumulate on the inner surfaces of the walls of the channels, thus forming a porous layer. As the particulate keeps accumulating on the inner surfaces of the walls of the channels, the pressure drop ΔP on the particulate filter 10 increases, as does the counter-pressure generated by the particulate filter 10.

The trapped particulate periodically needs to be removed by carrying out a so-called "regeneration" of the particulate filter 10, i.e. by removing the accumulated particulate. Regeneration can basically be divided into active regenerations, i.e. regenerations controlled by an electronic control unit, and spontaneous regenerations, i.e. regenerations generated in an uncontrolled and unforeseeable manner during a phase of accumulation.

Hence, during the operation of an internal combustion engine 1, a distinction can be made between accumulation phases, i.e. intervals of time in which there is a progressive accumulation of particulate in the particulate filter 10 and there are no active regenerations, but—at most—spontaneous regenerations, and regeneration phases, i.e. intervals of time in which the active regeneration controlled by the electronic control unit 18 takes place and the quantity of particulate accumulated in the particulate filter 10 decreases.

According to FIG. 2, the mass balance of the particulate filter 10 can be expressed as follows:

$$\dot{m}_{IN}=\dot{m}_{OUT}+\dot{m}_{GPF}+\dot{m}_B \quad [1]$$

wherein $\dot{m}_{IN}$ is the quantity of particulate produced by the internal combustion engine 1 and flowing into the particulate filter 10;

$\dot{m}_{OUT}$ is the quantity of particulate flowing out of the particulate filter 10;

$\dot{m}_{GPF}$ is the quantity of particulate trapped in the particulate filter 10; and $\dot{m}_B$ is the quantity of particulate burnt (or regenerated) in the particulate filter 10.

Furthermore, the efficiency $\eta_{GPF}$ of the particulate filter 10 or trapping efficiency $\eta_{GPF}$ can be expressed as follows:

$$\eta_{GPF}=1-(\dot{m}_{OUT}/\dot{m}_{IN}) \quad [2]$$

wherein $\dot{m}_{IN}$ is the quantity of particulate produced by the internal combustion engine 1 and flowing into the particulate filter 10;

$\dot{m}_{OUT}$ is the quantity of particulate flowing out of the particulate filter 10; and $\eta_{GPF}$ is the trapping efficiency of the particulate filter 10.

Experiments have shown that the efficiency $\eta_{GPF}$ of the particulate filter 10 (or trapping efficiency $\eta_{GPF}$) can vary as a function of a plurality of control parameters. Among them, in particular, besides the quantity $\dot{m}_{GPF}$ of particulate trapped in the particulate filter 10 and the volume flow rate $F_{EXH}$ of the exhaust gases flowing through the particulate filter 10, there is also the quantity $\dot{m}_{ASH}$ of metal powders accumulated in the particulate filter 10.

The metal powders accumulated in the particulate filter 10 help increase the trapping efficiency $\eta_{GPF}$ of the particulate filter 10 because they obstruct the channels with porous walls making up the particulate filter 10, but, unlike the particulate, cannot be regenerated.

Hereinafter we will describe, at first, the estimation model used to estimate the quantity of metal powders $\dot{m}_{ASH}$ accumulated in the particulate filter 10.

Figure 3:
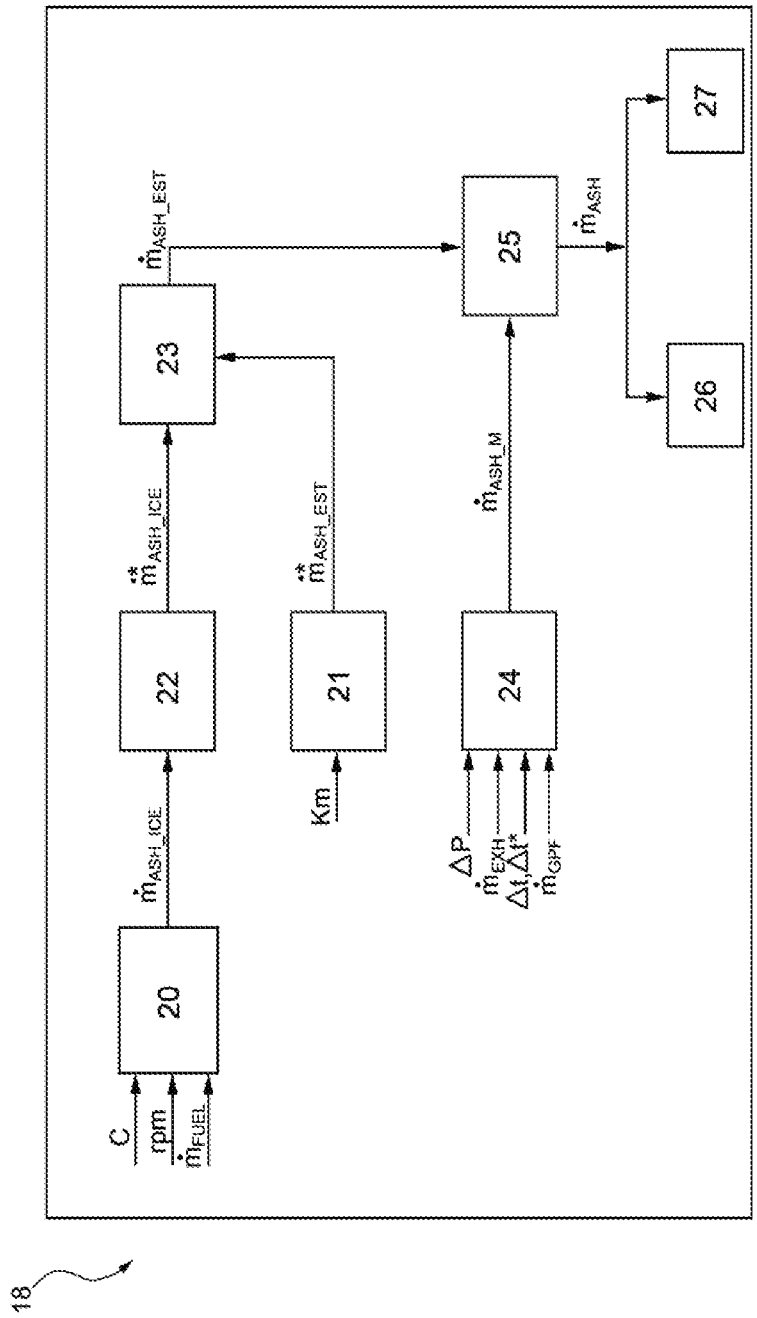
FIG. 3 is a block diagram schematically showing the method to determine the quantity of metal powders accumulated in the particulate filter according to the invention.

According to FIG. 3, first of all, the electronic control unit 18 is configured to estimate the quantity $\dot{m}_{ASH\_ICE}$ of metal powder (ash) generated by the internal combustion engine 1. The control unit 18 is advantageously designed to estimate the quantity $\dot{m}_{ASH\_ICE}$ of metal powders generated by the internal combustion engine 1 through an estimation model 20 to estimate the quantity $\dot{m}_{ASH\_ICE}$ of metal powders generated by the internal combustion engine 1, which is stored in the control unit 18 and uses given physical quantities.

In particular, the estimation model 20 to estimate the quantity $\dot{m}_{ASH\_ICE}$ of metal powders generated by the internal combustion engine 1 uses quantities such as speed of rotation of the internal combustion engine 1 (rpm);

load of the internal combustion engine 1 ($c$);

quality and quantity of fuel used by the internal combustion engine 1 ($\dot{m}_{FUEL}$);

quantity of oil consumed by the internal combustion engine 1.

The electronic control unit 18 is further configured to estimate the quantity $\dot{m}^*_{ASH\_EST}$ of metal powders trapped in the particulate filter 10. The control unit 18 is advantageously designed to estimate the quantity $\dot{m}^*_{ASH\_EST}$ of metal powders trapped in the particulate filter 10 through an estimation model 21 to estimate the quantity $\dot{m}^*_{ASH\_EST}$ of metal powders trapped in the particulate filter 10, which is stored in the control unit 18 and uses measured and/or given physical quantities. In particular, the estimation model 21 is designed to estimate the quantity $\dot{m}^*_{ASH\_EST}$ of metal powders trapped in the particulate filter 10 as a function of the distance (i.e. of the number of kilometres) covered by the vehicle.

The estimation model 20 supplies the estimated value of the quantity $\dot{m}_{ASH\_ICE}$ of metal powders generated by the internal combustion engine 1 to a processing block 22.

The processing block 22 integrates in time the estimated value of the quantity $\dot{m}_{ASH\_ICE}$ of metal powders generated by the internal combustion engine 1, so as to obtain a total estimated value $\dot{m}^*_{ASH\_ICE}$ of the quantity $\dot{m}_{ASH\_ICE}$ of metal powders generated by the internal combustion engine 1

The total estimated value of the quantity $\dot{m}_{ASH\_ICE}$ of metal powders generated by the internal combustion engine 1 and the estimated value of the quantity $\dot{m}^*_{ASH\_EST}$ of metal powders trapped in the particulate filter 10 are supplied, as an input, to a further processing block 23.

The processing block 23 determines the greatest value between said total estimated value of the quantity $\dot{m}_{ASH\_ICE}$ of metal powders generated by the internal combustion engine 1 and the estimated value of the quantity $\dot{m}^*_{ASH\_EST}$ of metal powders trapped in the particulate filter 10

The greatest value is the actual estimated value of the quantity $\dot{m}_{ASH\_EST}$ of metal powders trapped in the particulate filter 10.

Hereinafter we will describe the measure model 24 used to measure the quantity $\dot{m}_{ASH\_M}$ of metal powders trapped in the particulate filter (10).

The measure model 24 uses physical quantities measured and/or determined through the electrical signal provided by the differential pressure sensor 14 and indicating the pressure drop $\Delta P$ at the ends of the particulate filter 10, and through the volume flow rate $\dot{m}_{EXH}$ of the exhaust gases produced by the internal combustion engine 1 and flowing into the particulate filter 10.

The volume flow rate $\dot{m}_{EXH}$ of the exhaust gases produced by the internal combustion engine 1 and flowing into the particulate filter 10 can be determined through a so-called lambda probe (namely a UHEGO or UEGO linear oxygen sensor, which is known and not described in detail), which measures the air/fuel ratio of the exhaust gases in the exhaust duct 7 and is capable of determining, knowing the operating features of the sensor, the volume flow rate $\dot{m}_{EXH}$ of the exhaust gases. The volume flow rate $\dot{m}_{EXH}$ of the exhaust gases is usually calculated starting from an estimation of the mass of air trapped in the cylinders, which is added to the quantity of fuel injected into the cylinders through the information contained in the signal transmitted by the lambda probe. The estimation of the mass of air trapped in the cylinders takes place, alternatively, based on the information contained in the signal transmitted by the air flow rate measurer 13 or by means of an "Air Charge" calculation model based on the temperature and pressure of the air flow sucked in together with the speed of rotation of the internal combustion engine 1 and the number of cylinders.

It is evident that, in order to use, inside the measure model 24, the electrical signal provided by the differential pressure sensor 14 and indicating the pressure drop $\Delta P$ at the ends of the particulate filter 10, said pressure drop $\Delta P$ at the ends of the particulate filter 10 needs to be completely attributable to the metal powders trapped in the particulate filter 10 and there cannot be any particulate trapped inside the particulate filter 10, which would be co-responsible for the pressure drop $\Delta P$ at the ends of the particulate filter 10 detected by the pressure sensor 14.

Therefore, the electronic control unit 18 is designed to make sure that the quantity $\dot{m}_{GPF}$ of particulate trapped in the particulate filter 10 is equal to zero. The quantity $\dot{m}_{GPF}$ of particulate trapped in the particulate filter 10 typically is equal to zero under engine cut-off conditions. Indeed, experiments have shown that spontaneous regeneration of the particulate filter 10 is obtained through the combustion (oxidation) of the accumulated particulate, which, as it mainly consists of carbon, reacts with the oxygen present in the exhaust gases, thus transforming into carbon monoxide (CO) and carbon dioxide ($CO_2$). In order for the combustion reaction (oxidation) of the accumulated particulate to be spontaneously activated, some activation conditions must occur, in particular concerning the flow rate of the oxygen present in the exhaust gases and the temperature $T_{IN}$ of the exhaust gases flowing into the particulate filter 10 (in particular, the temperature $T_{IN}$ of the exhaust gases flowing into the particulate filter 10 must be in the range of 500° C.-600° C.). These activation conditions do not frequently occur under normal operating conditions of the internal combustion engine 1, but they are always met under engine cut-off conditions, namely when the delivery of fuel to the injectors is interrupted in the release phase (namely, when the accelerator pedal is completely lifted and the internal combustion engine 1 is dragged by the wheels).

Under stoichiometric conditions of the air/fuel ratio of the exhaust gases ($\lambda=1$), indeed, the oxidizer flow rate (oxygen) present in the exhaust gases does not allow the combustion reaction (oxidation) of the accumulated particulate to be spontaneously activated.

In case of lean air/fuel equivalence ratio, namely when the equivalence ratio $\lambda$ of the exhaust gases (i.e. the ratio between the air/fuel ratio of the exhaust gases and the air/fuel ratio of the exhaust gases under stoichiometric conditions) is smaller than 1, there is an excess of fuel and the oxidizer (oxygen) in the exhaust gases does not allow the combustion reaction (oxidation) of the accumulated particulate to be spontaneously activated.

On the other hand, in case of rich air/fuel equivalence ratio, namely when the equivalence ratio $\lambda$ of the exhaust gases (i.e. the ratio between the air/fuel ratio of the exhaust gases and the air/fuel ratio of the exhaust gases under stoichiometric conditions) is greater than 1, there is an excess of oxidizer (oxygen) in the exhaust gases, which allows the combustion reaction (oxidation) of the accumulated particulate to be spontaneously activated.

As a consequence, it is evident that, under engine cut-off conditions, by interrupting the delivery of fuel to the injectors, it is possible to achieve the maximum value of the flow rate of the oxygen present in the exhaust gases available for the spontaneous combustion reaction (oxidation) of the particulate accumulated in the particulate filter 10.

At the end of an engine cut-off, whose duration is at least equal to a predetermined duration value $\Delta t$, the electronic control unit 18 recognizes that the quantity $\dot{m}_{GPF}$ of particulate trapped in the particulate filter 10 is equal to zero and that, as a consequence, the pressure drop $\Delta P$ at the ends of the particulate filter 10 detected by the pressure sensor 14 is completely attributable to the metal powders trapped in the particulate filter 10.

Alternatively, the electronic control unit 18 is designed to make sure that the quantity $\dot{m}_{GPF}$ of particulate trapped in the particulate filter 10 is equal to zero at the end of an active regeneration phase.

More in detail, at the end of an active regeneration phase, whose duration is at least equal to a predetermined duration value $\Delta t^*$, the electronic control unit 18 recognizes that the quantity $\dot{m}_{GPF}$ of particulate trapped in the particulate filter 10 is equal to zero and that, as a consequence, the pressure drop $\Delta P$ at the ends of the particulate filter 10 detected by the pressure sensor 14 is completely attributable to the metal powders trapped in the particulate filter 10.

Alternatively, the control unit 18 is designed to is designed to determine the quantity $\dot{m}_{GPF}$ of particulate trapped in the particulate filter 10 through a calculation model, which is stored in the electronic control unit 18 and uses measured and/or given physical quantities. In particular, the calculation model typically is divided into an estimation model and/or into a measure model for the quantity $\dot{m}_{GPF}$ of particulate trapped in the particulate filter 10. Both the estimation model and the measure model use measured and/or given physical quantities.

More in detail, once the quantity $\dot{m}_{GPF}$ of particulate trapped in the particulate filter 10 has been determined, the electronic control unit 18 can recognize the pressure drop $\Delta P$ at the ends of the particulate filter 10 for which the quantity $\dot{m}_{GPF}$ of particulate trapped in the particulate filter 10 is responsible.

Inside the electronic control unit 18, a map is stored which provides the quantity $\dot{m}_{GPF}$ of particulate trapped in the particulate filter 10 as a function of the pressure drop $\Delta P$ at the ends of the particulate filter 10 and of the volume flow rate $\dot{m}_{EXH}$ of the exhaust gases produced by the internal combustion engine 1. By mathematical inversion of said map, it is possible to obtain the pressure drop $\Delta P^*$ at the ends of the particulate filter 10 which is due to the quantity $\dot{m}_{GPF}$ of particulate trapped in the particulate filter 10 as a function of the quantity $\dot{m}_{GPF}$ of particulate trapped in the particulate filter 10 and of the volume flow rate $\dot{m}_{EXH}$ of the exhaust gases produced by the internal combustion engine 1.

If the actual pressure drop $\Delta P$ at the ends of the particulate filter 10 detected by the pressure sensor 14 exceeds the pressure drop $\Delta P^*$, this means that the difference between said two values (the actual pressure drop $\Delta P$ at the ends of the particulate filter 10 and the pressure drop $\Delta P^*$) is due to the metal powders trapped in the particulate filter 10.

It is evident that, according to this last embodiment, the value of the quantity $\dot{m}_{GPF}$ of particulate trapped in the particulate filter 10 needs to be calculated in an extremely solid and reliable manner, so as to avoid overestimating or underestimating the measured value of the quantity $\dot{m}_{ASH\_M}$ of metal powders trapped in the particulate filter 10.

Once the quantity $\dot{m}_{GPF}$ of particulate trapped in the particulate filter 10 has been detected or the condition of quantity $\dot{m}_{GPF}$ of particulate trapped in the particulate filter 10 equal to zero has been recognized, the electronic control unit 18 can calculate the measured value of the quantity $\dot{m}_{ASH\_M}$ of metal powders trapped in the particulate filter 10 as a function of the pressure drop $\Delta P$ at the ends of the particulate filter 10 and of the volume flow rate $\dot{m}_{EXH}$ of the exhaust gases produced by the internal combustion engine 1 and flowing into the particulate filter 10.

The signal generated by the measure model 24 is used to update the actual estimated value of the quantity $\dot{m}_{ASH\_EST}$ of metal powders trapped in the particulate filter 10. The method basically involves updating the actual estimated value of the quantity $\dot{m}_{ASH\_EST}$ of metal powders trapped in the particulate filter 10 as a function of the measured value of the quantity $\dot{m}_{ASH\_EST}$ of metal powders trapped in the particulate filter 10.

Therefore, the electronic control unit 18 is designed to determine the actual (or real) value of the quantity $\dot{m}_{ASH}$ of metal powders trapped in the particulate filter 10 on the inside of a processing block 25, which receives, as an input, both the measured value of the quantity $\dot{m}_{ASH\_EST}$ of metal powders trapped in the particulate filter 10 and the actual estimated value of the quantity $\dot{m}_{ASH\_EST}$ of metal powders trapped in the particulate filter 10.

According to a first variant, in case the condition of quantity $\dot{m}_{GPF}$ of trapped particulate equal to zero is recognized, the actual (or real) value of the quantity $\dot{m}_{ASH}$ of metal powders trapped in the particulate filter 10 can be used by the electronic control unit 18 as control variable to update the calculation model 26 used to determine the quantity $\dot{m}_{GPF}$ of particulate trapped in the particulate filter 10. In particular, once the actual pressure drop $\Delta P$ due to the metal powders trapped in the particulate filter 10 has been determined, said actual pressure drop $\Delta P$ can be used to update the pressure drop $\Delta P$ that, on the other hand, is due to the quantity $\dot{m}_{GPF}$ of particulate trapped in the particulate filter 10.

Similarly, since, as already mentioned above, experiments have shown that the efficiency $\eta_{GPF}$ of the particulate filter 10 (or trapping efficiency $\eta_{GPF}$) is variable, among other things, also as a function of the quantity $\dot{m}_{ASH}$ of metal powders accumulated in the particulate filter 10, the actual (or real) value of the quantity $\dot{m}_{ASH}$ of metal powders trapped in the particulate filter 10 can be used by the electronic control unit 18 as control variable to update the value of the efficiency $\eta_{GPF}$ of the particulate filter 10 in the processing block 27.

In particular, the electronic control unit 18 is configured to determine (and/or estimate) the component of the efficiency $\eta_{GPF}$ of the particulate filter 10 attributable to the metal powders trapped in the particulate filter 10.

More in detail, a map is stored inside the electronic control unit 18 which provides an additive contribution of the efficiency $\eta_{GPF}$ of the particulate filter 10 exclusively due to metal powders or ashes trapped in the particulate filter 10, on a calibration vector representing the permeability of the particulate filter 10 as a function of the quantity of metal powders or ashes trapped in the particulate filter 10.

Once the component of the efficiency $\eta_{GPF}$ of the particulate filter 10 attributable to the metal powders trapped in the particulate filter 10 has been calculated, the estimation model and/or the calculation of the efficiency $\eta_{GPF}$ of the particulate filter 10 can be updated in order to identify the component of the efficiency $\eta_{GPF}$ of the particulate filter attributable to the actual particulate.

The advantages of the method described herein are evident from the description above.

In particular, the method disclosed herein allows the actual (or real) value of the quantity $\dot{m}_{ASH}$ of metal powders trapped in the particulate filter 10 to be determined in a way that is deemed to be efficient (i.e. with an adequate precision), effective (i.e. quickly and without requiring an excessive calculation power for the electronic control unit 18) and economic (i.e. without requiring the installation of expensive components and/or sensors in addition to the one normally present).

The invention claimed is:

1. A method to determine the actual quantity ($\dot{m}_{ASH}$) of metal powders or ashes trapped in a particulate filter (10) for an internal combustion engine (1) of a vehicle comprising the steps of:
    estimating a first value of the quantity ($\dot{m}_{ASH\_EST}$) of metal powders trapped in the particulate filter (10) based on a first model (20, 21, 22, 23) using measured and/or given physical quantities;
    measuring a second value of the quantity ($\dot{m}_{ASH\_M}$) of metal powders trapped in the particulate filter (10) based on a second model (24), which uses the pressure drop ($\Delta P$) at the ends of the particulate filter (10) for which the quantity ($\dot{m}_{ASH\_M}$) of metal powders trapped in the particulate filter (10) is responsible, and the volume flow rate ($\dot{m}_{EXH}$) of the exhaust gases produced by the internal combustion engine (1) and flowing into the particulate filter (10); said measuring step comprises the sub-steps of:
        detecting the pressure drop ($\Delta P$) at the ends of the particulate filter (10) through a differential pressure sensors (14) at the ends of the particulate filter (10);
        determining a quantity ($\dot{m}_{GPF}$) of particulate trapped in the particulate filter (10);
        determining the pressure drop ($\Delta P$) at the ends of the particulate filter (10) for which the quantity ($\dot{m}_{GPF}$) of particulate trapped in the particulate filter (10) is responsible; and
        calculating the pressure drop ($\Delta P$) at the ends of the particulate filter (10) for which the quantity ($\dot{m}_{ASH\_M}$) of metal powders trapped in the particulate filter (10) is responsible through the difference between the pressure drop ($\Delta P$) at the ends of the particulate filter (10) and the pressure drop ($\Delta P$) at the ends of the particulate filter (10) for which the quantity ($\dot{m}_{GPF}$) of particulate trapped in the particulate filter (10) is responsible;
    updating the first value as a function of the second value of the quantity ($\dot{m}_{ASH\_M}$) of metal powders trapped in the particulate filter (10); and
    determining the actual quantity ($\dot{m}_{ASH}$) of metal powders or ashes trapped in the particulate filter (10) as a function of the update of the first value.

2. A method according to claim 1 and comprising a step in which to check whether a quantity ($\dot{m}_{GPF}$) of particulate trapped in the particulate filter (10) is equal to zero before using said measure model (24) in order to determine the measured value of the quantity ($\dot{m}_{ASH\_M}$) of metal powders trapped in the particulate filter (10).

3. A method according to claim 1, wherein said first value is determined based on the first model (20, 21, 22, 23) using the following measured and/or given physical quantities:
    speed (rpm) of rotation of the internal combustion engine (1);
    load (c) of the internal combustion engine (1);
    quality and quantity ($\dot{m}_{FUEL}$) of fuel used by the internal combustion engine (1);
    quantity of oil consumed by the internal combustion engine (1).

4. A method according to claim 1, wherein said first value is determined based on the first model (20, 21, 22, 23) using the physical quantities such as the number of kilometres covered by the vehicle.

5. A method according to claim 1, wherein the sub-step of determining a quantity ($\dot{m}_{GPF}$) of particulate trapped in the particulate filter (10) involves:
    recognizing an engine cut-off condition, in which the delivery of fuel to the injectors of the internal combustion engine (1) is interrupted; and
    causing the quantity ($\dot{m}_{GPF}$) of particulate trapped in the particulate filter (10) to be equal to zero; wherein the pressure drop ($\Delta P$) at the ends of the particulate filter (10) for which the quantity ($\dot{m}_{GPF}$) of particulate trapped in the particulate filter (10) is responsible is equal to zero.

6. A method according to claim 5, wherein the engine cut-off condition is maintained for a time interval ($\Delta t$) with a predetermined duration.

7. A method according to claim 1, wherein the sub-step of determining a quantity ($\dot{m}_{GPF}$) of particulate trapped in the particulate filter (10) involves:
    recognizing an active regeneration condition of the particulate filter (10); and
    causing the quantity ($\dot{m}_{GPF}$) of particulate trapped in the particulate filter (10) to be equal to zero; wherein the pressure drop ($\Delta P$) at the ends of the particulate filter (10) for which the quantity ($\dot{m}_{GPF}$) of particulate trapped in the particulate filter (10) is responsible is equal to zero.

8. A method according to claim 7, wherein the active regeneration step of the particulate filter (10) has a duration that is at least equal to a predetermined value ($\Delta t^*$).

9. A method according to claim 1, wherein the sub-step of determining a quantity ($\dot{m}_{GPF}$) of particulate trapped in the particulate filter (10) involves using a third model using measured and/or given physical quantities.

10. A method according to claim 1, wherein the actual quantity ($\dot{m}_{ASH}$) of metal powders or ashes trapped in a particulate filter (10) is used to update a quantity ($\dot{m}_{GPF}$) of particulate trapped in the particulate filter (10) calculated based on an estimation model (26) using measured and/or given physical quantities.

11. A method according to claim 1, wherein the actual quantity ($\dot{m}_{ASH}$) of metal powders or ashes trapped in a particulate filter (10) is used to update a an efficiency ($\eta_{GPF}$) of the particulate filter (10).

* * * * *